US010628480B2

(12) United States Patent
Frigon

(10) Patent No.: US 10,628,480 B2
(45) Date of Patent: Apr. 21, 2020

(54) LINKING TAGS TO USER PROFILES

(71) Applicant: Angel Technologies, LLC, San Francisco, CA (US)

(72) Inventor: Mark Frederick Frigon, San Francisco, CA (US)

(73) Assignee: ANGEL TECHNOLOGIES, LLC, San Francisco, CA (US)

( * ) Notice: Subject to any disclaimer, the term of this patent is extended or adjusted under 35 U.S.C. 154(b) by 0 days.

(21) Appl. No.: 16/537,227

(22) Filed: Aug. 9, 2019

(65) Prior Publication Data

US 2019/0361931 A1    Nov. 28, 2019

Related U.S. Application Data

(63) Continuation of application No. 15/933,531, filed on Mar. 23, 2018, now Pat. No. 10,417,275, which is a continuation of application No. 14/053,626, filed on Oct. 15, 2013, now Pat. No. 9,959,291, which is a continuation of application No. 09/991,324, filed on Nov. 15, 2001, now Pat. No. 8,954,432.

(60) Provisional application No. 60/248,994, filed on Nov. 15, 2000.

(51) Int. Cl.
*G06F 16/00* (2019.01)
*G06F 16/583* (2019.01)
*G06F 16/58* (2019.01)
*G06F 3/0482* (2013.01)

(52) U.S. Cl.
CPC .......... *G06F 16/583* (2019.01); *G06F 3/0482* (2013.01); *G06F 16/58* (2019.01)

(58) Field of Classification Search
CPC .............................. G06F 16/58; G06F 16/583
See application file for complete search history.

(56) References Cited

U.S. PATENT DOCUMENTS

| 4,847,604 | A | 7/1989 | Doyle |
| 5,063,603 | A | 11/1991 | Burt |
| 5,553,281 | A | 9/1996 | Brown |
| 5,721,851 | A | 2/1998 | Cline |
| 5,802,361 | A | 9/1998 | Wang |
| 5,893,110 | A | 4/1999 | Weber |
| 5,937,413 | A | 8/1999 | Hyun |
| 6,014,644 | A | 1/2000 | Erickson |
| 6,029,141 | A | 2/2000 | Bezos |
| 6,038,333 | A | 3/2000 | Wang |

(Continued)

OTHER PUBLICATIONS

Article entitled "Direct annotation: a drag-and-drop strategy for labeling photos", dated Jul. 21, 2000.*

(Continued)

*Primary Examiner* — Mahesh H Dwivedi
(74) *Attorney, Agent, or Firm* — Nixon Peabody LLP

(57) ABSTRACT

A system, computer program, and method for storing and sharing images such as photographs via a communications network (16) and for permitting the identification of objects within the images. The invention allows the identification of objects such as persons within the photos without requiring the person submitting the photos to type in identification information for each and every photo in a photo album. The invention also allows users to automatically share their photos with others and to automatically search for photos and/or certain people in photos.

30 Claims, 9 Drawing Sheets

(56) References Cited

U.S. PATENT DOCUMENTS

| | | | |
|---|---|---|---|
| 6,049,776 A * | 4/2000 | Donnelly | G06Q 10/063112 |
| | | | 705/7.14 |
| 6,097,853 A | 8/2000 | Gu | |
| 6,216,133 B1 | 4/2001 | Masthoff | |
| 6,236,978 B1 | 5/2001 | Tuzhilin | |
| 6,288,717 B1 | 9/2001 | Dunkle | |
| 6,332,193 B1 | 12/2001 | Glass | |
| 6,353,452 B1 | 3/2002 | Hamada | |
| 6,411,949 B1 | 6/2002 | Schaffer | |
| 6,442,573 B1 | 8/2002 | Schiller | |
| 6,496,594 B1 | 12/2002 | Prokoski | |
| 6,542,936 B1 | 4/2003 | Mayle | |
| 6,545,660 B1 | 4/2003 | Shen | |
| 6,556,709 B1 | 4/2003 | Kumar | |
| 6,587,593 B1 | 7/2003 | Matsuoka | |
| 6,616,701 B2 | 9/2003 | Doyle | |
| 6,687,878 B1 * | 2/2004 | Eintracht | G06F 17/241 |
| | | | 715/201 |
| 6,714,793 B1 * | 3/2004 | Carey | H04L 51/04 |
| | | | 455/466 |
| 6,829,607 B1 | 12/2004 | Tafoya | |
| 6,931,419 B1 | 8/2005 | Linquist | |
| 6,973,201 B1 | 12/2005 | Colmenarez | |
| 7,010,751 B2 | 3/2006 | Shneiderman | |
| 7,028,253 B1 | 4/2006 | Lieberman | |
| 7,068,309 B2 | 6/2006 | Toyama | |
| 7,209,149 B2 | 4/2007 | Jogo | |
| 7,243,079 B1 | 7/2007 | Manolis | |
| 7,275,095 B1 * | 9/2007 | Lebouill | H04L 12/2801 |
| | | | 348/E7.061 |
| 7,576,752 B1 | 8/2009 | Benson | |
| 8,954,432 B2 | 2/2015 | Frigon | |
| 9,959,291 B2 | 5/2018 | Frigon | |
| 10,417,275 B2 | 9/2019 | Frigon | |
| 2001/0037721 A1 | 11/2001 | Hasegawa | |
| 2002/0039447 A1 | 4/2002 | Shniberg | |
| 2002/0054059 A1 | 5/2002 | Schneiderman | |
| 2002/0055955 A1 | 5/2002 | Lloyd-Jones | |
| 2002/0059201 A1 | 5/2002 | Work | |
| 2002/0069222 A1 | 6/2002 | McNeely | |
| 2002/0093678 A1 * | 7/2002 | Skidgel | G06F 16/58 |
| | | | 358/1.15 |
| 2002/0103813 A1 | 8/2002 | Frigon | |
| 2002/0184203 A1 | 12/2002 | Nastar | |
| 2003/0076363 A1 | 4/2003 | Murphy | |
| 2018/0322146 A1 | 11/2018 | Frigon | |

OTHER PUBLICATIONS

Article entitled "Visualization methods for personal photo collections: browsing and searching in the PhotoFinder", by Kang et al., dated Aug. 2, 2000.*

Bakic, V. et al., "Menu Selection by Facial Aspect," Vision Interface '99, May 21, 1999, pp. 203-209 (7 pages).

Ghidary, S.S. et al., "Human detection and localization at indoor environment by home robot," IEEE International Conference on Systems, Man and Cybernetics, Oct. 11, 2000 (10 pages).

Han, C-C. et al., "Fast Face Detection via Morphology-Based Pre-processing," ResearchGate, Jan. 1997 (24 pages).

Kang, H. et al., "Visualization Methods for Personal Photo Collections: Browsing and Searching in PhotoFinder," IEEE International Conference on Multimedia and Expo, Aug. 2, 2000 (6 pages).

Rex, E., "Online Photo Delivery," Upside, Jun. 2000, pp. 331-338 (6 pages).

Stewart, J. et al., "Single Display Groupware: A Model for Co-present Collaboration," May 20, 1999, pp. 286-293 (8 pages).

Chang, S-F, "Content-Based Indexing and Retrieval of Visual Information," IEEE Signal Processing Magazine, vol. 14, No. 4, Jul. 1997, pp. 45-48 (4 pages).

Meyer, E.A. et al., "Borealis Image Server," Computer Networks and ISDN Systems, May 28, 1996, pp. 1123-1137 (15 pages).

Swain, M.J., "Searching for Multimedia on the World Wide Web," Proceedings of the 1999 IEEE Conferences on Multimedia Computing and Systems, Jun. 1999, pp. 32-37 (6 pages).

Wei, G. et al., "Face Detection for Image Annotation," Pattern Recognition Letters, 20, 1999, pp. 1313-1321 (9 pages).

Kuchinsky, et al., "FotoFile: A Consumer Multimedia Organization and Retrieval System," May 20, 1999, ACM, pp. 496-503 (8 pages).

Schneiderman et al., "Direct Annotation: A Drag-and-Drop Strategy for Labeling Photos," Jul. 21, 2000 (8 pages).

* cited by examiner

LINKING TAGS TO USER PROFILES

CROSS REFERENCE TO RELATED APPLICATIONS

This application is a continuation of U.S. patent application Ser. No. 15/933,531, filed Mar. 23, 2018, now allowed, which is a continuation of U.S. patent application Ser. No. 14/053,626, filed Oct. 15, 2013, now U.S. Pat. No. 9,959, 291, which is a continuation of U.S. patent application Ser. No. 09/991,324, filed Nov. 15, 2001, now U.S. Pat. No. 8,954,432, which claims priority to and the benefit of U.S. Provisional Patent Application No. 60/248,994, filed Nov. 15, 2000, the contents of which are each hereby incorporated by reference herein in their entireties.

BACKGROUND OF THE INVENTION

Field of the Invention

The present invention relates to computer software. More particularly, the invention relates to a method and apparatus for storing and sharing images such as photographs via a communications network and for permitting the identification of objects and the location of the objects within the images. The invention enables users to supply and/or receive information about the existence of objects within images.

Portions of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

Background

Digital photography allows people to quickly and easily take, print, and/or share photos without film and the associated film developing costs. The popularity of digital photography has increased dramatically due to the increased availability of digital cameras and the widespread acceptance of the Internet. Many Internet users have created websites that organize their digital photographs into online photo albums that can be accessed by other Internet users. These web pages permit a large number of people to view the photos and allow the author to both add and remove photos from an album.

Although creating web pages for online photo albums offer advantages over traditional photo albums, their creation requires programming expertise such as skill in Hypertext Markup Language (HTML). Many people do not have the technical knowledge and/or time to build their own online photo albums. Sharing of photos from online photo albums is also problematic and requires that each photo be manually sent, e-mailed, or downloaded. If the recipient wishes to use the photos in their own web pages, each photo must be then uploaded to an additional site. These steps are time consuming, duplicative, and also require programming knowledge.

To address these problems, several websites that specialize in online photo albums have been created. These websites allow users without programming skills to quickly and easily create and maintain online photo albums. Users are only required to upload photos that they wish to add to an online photo album. The sites, through programming on the webserver, or "server-side scripting", then create all necessary HTML programming to add the uploaded photos to the users' photo albums. Many of these sites also offer image enhancement capabilities (e.g. sharpen, brighten, reduce "red-eye", etc.), as well as photo printing and developing functions. Photo-specific sites have also eased the process of sharing photos by providing a means for users to quickly and easily e-mail links to photos or photos themselves to one another and, in some cases, contribute photos directly to other's photo albums.

While websites that specialize in the creation of online photo albums offer many advantages, they suffer from several limitations. For example, existing websites do not offer users the ability to identify objects within photos. If a user is viewing a photo and does not know certain individuals in the picture, the user is unable to use current systems to determine their identities. Typically, photo album sites offer the ability to describe uploaded photos through the use of captions or other descriptive fields. These fields may be used to describe or name individuals within the photo. For example, a user may upload a photo and give it a caption of "Stephanie rollerblading with Tauny". This caption alone is not sufficient information to ensure the viewer can correctly determine the identities of the individuals within the photo, because to do so would require prior knowledge of which person is "Stephanie" and which is "Tauny". A viewer who does not know these individuals may have difficulty or be unable to correctly identify the individuals within the photo. Furthermore, less descriptive captions such as "The Family at the beach" would offer little help unless the viewer knows each individual in the photo. Thus, in order to provide sufficient information required to ensure a viewer can identify individuals within a photo, copious descriptions must be input and maintained by users. Typing such captions or descriptions is very time consuming and tedious, especially when a large number of photos are uploaded. Furthermore, when the same person appears in multiple photos, the submitter is still required to retype the identification information into a caption for each photo.

Processes have been developed to identify individuals within photos. For example, one process requires people to wear badges containing identification information such as unique color codings when their photos are taken. When a computer processes a photo containing a badge, the computer can access a database to determine which badge was assigned to which person and then identifies the person as existing in this photo. This process has many drawbacks including the dependence on physical badges. If the badges cannot be seen in the photos, the people wearing the badges cannot be identified. Moreover, this process is not functional for the vast majority of photographs: any photos that were taken outside of this tightly controlled environment.

Another problem with photo-specific websites is that they have no search capabilities that permit users to search for photos of specific individuals. Users wishing to view all photographs that contain a particular person must manually access all possible photo albums to find the desired photos. For example, if a user wishes to find all pictures of a particular friend, the user may have to browse through several of his/her own albums where that friend may appear (e.g. "High School pictures", "Reunion Weekend", etc.), as well as access and browse through each of the friend's albums, or any third-party's albums where the friend may appear. With a reasonable number of photos, this becomes time-prohibiting if not impossible. Search features could be designed to search aforementioned descriptive fields (e.g. a caption), however, as there is no naming standard, people are described differently by different people (e.g. first name, last name, full name, nickname, etc.) and many names would be used to describe multiple people (e.g. Mom, Dad, John, etc.). As a result, it would be difficult to have a one to one relationship between descriptions of people and people themselves. Consequently, searches would be unreliable, likely returning many photos of little relevance and failing to return photos that would be of relevance. For example, a search for the term "John Smith" would fail to return photos in which this person was referred to as "John" or, perhaps, "Dad". However, this same search likely would return photos of other individuals who share the same name "John Smith".

While reliable database searchability for digital images over the Internet is available, it has not been implemented with photo albums. Particularly, several companies which sell and license images have put catalogs of digital photographs on the Internet. Such websites generally describe images in terms of themes (e.g. sunset, dark or sad) or broad descriptions of objects therein (e.g. beach, farmland, or water), without identifying the objects explicitly. For example, a picture of a man and woman on the beach at sunset, which could be licensed to a beach resort for print or web use, could be identified as "beach", "sunset", and/or "man and woman". While such descriptive terms can provide a reliable mechanism for searching for images matching the terms, they do not uniquely identify any objects in the images, nor do they have the capability of identifying where these objects appear within the images. For example, a search for the term "clown" is likely to return many pictures of clowns, however, it is very unlikely that every clown pictured would be the same person, just as a search for the term "beach" is unlikely to return pictures of the same beach. Even a search for the term "President" will return several photos of different people. Furthermore, the objects that appear within a photo are not identified as being in a particular area within the photo, they merely are described as being in the photo. For example, websites that return a photograph from a "President" search do not have the capability of identifying that the President is in, perhaps, the lower right corner of the picture. Such technologies have the capability to describe the nature or theme of a photo but not to uniquely identify who or what is in the photo or where in the photo it appears.

Another related limitation of prior art websites is that the captions described above contain static information only, such as names, and do not provide a way to obtain additional information about a person or object such as contact information or to locate additional photos of the person or object.

Another problem with photo-specific websites is that users wishing to share their photos must proactively e-mail or otherwise send their photos to others (i.e., a photo is not automatically shared when a user is described in a photo). For example, even if a user describes a photos as containing "Jane@doe.com" and "John@doe.com", existing website will not share the photos with these individuals. Through a separate process, the user must still email this photo or otherwise share the photo with, in this case, Jane and John. Although photo-specific websites ease this process, it is still time consuming for users with large photo albums and/or a large number of friends to send their photos to all such persons.

SUMMARY OF THE INVENTION

An embodiment of the invention comprises a system and method for identifying and displaying objects (in most cases, a person) within a digital image over a system of interconnected computers (e.g. client/server, peer-to-peer, etc. . . . ). For example, a user can identify where a person exists in an image by selecting the person's name (e.g. from a list) and clicking on the person's location in the image. By identifying people within images, the system is able to search for images where a specified person(s) appears as well as generate output that recognizes where in the image a person appears. This output is also capable of creating hyperlinks and calls to client-side scripts from the otherwise "static" image file. In an embodiment of the invention the system can also utilize artificial intelligence algorithms to locate other images where the identified object has not yet been defined by a user of the system.

While, one embodiment of this invention utilizes the Internet as the medium for communication and web pages for displaying data, the scope of this invention is not limited specifically to the Internet and/or to web pages. The invention contemplates the use of any display output in a computer environment (e.g. any types of document). The terms person, people, and/or object are used interchangeably and meant to refer to any object(s) (e.g. a pet, a possession, a place, or a thing) a user wishes to identify within a digital image. This most frequently will, in fact, be a person. When shown within the bounds of an image, a person is considered akin to any type of object. Thus, the reader should note that the invention can be utilized to identify any type of object within an image.

Depending on the computer environment, different media will be used for output and display to the client. On the Internet, the most accessible and most common output is Hypertext Markup Language ("HTML"). However, the functionality of HTML can be duplicated or configured in other non-HTML media. For the sake of both brevity and clarity, I will outline an embodiment of the present invention that utilizes HTML. This embodiment of the present invention (i.e. utilizing the Internet and HTML) is logical due to the broad reach of the Internet and wide acceptance of HTML. However the scope of the invention is not intended to be limited to the use HTML or the Internet.

DESCRIPTION OF THE DRAWINGS

An embodiment of the invention is described in detail below with reference to the attached drawing figures, wherein.

The figures do not limit the invention to the specific embodiments disclosed and described herein. The drawings are not necessarily to scale, emphasis instead being placed upon clearly illustrating the principles of the invention.

DETAILED DESCRIPTION

The invention described below is a method and apparatus for obtaining information relating to the existence of at least one object in an image. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

General System Architecture

Figure 1:
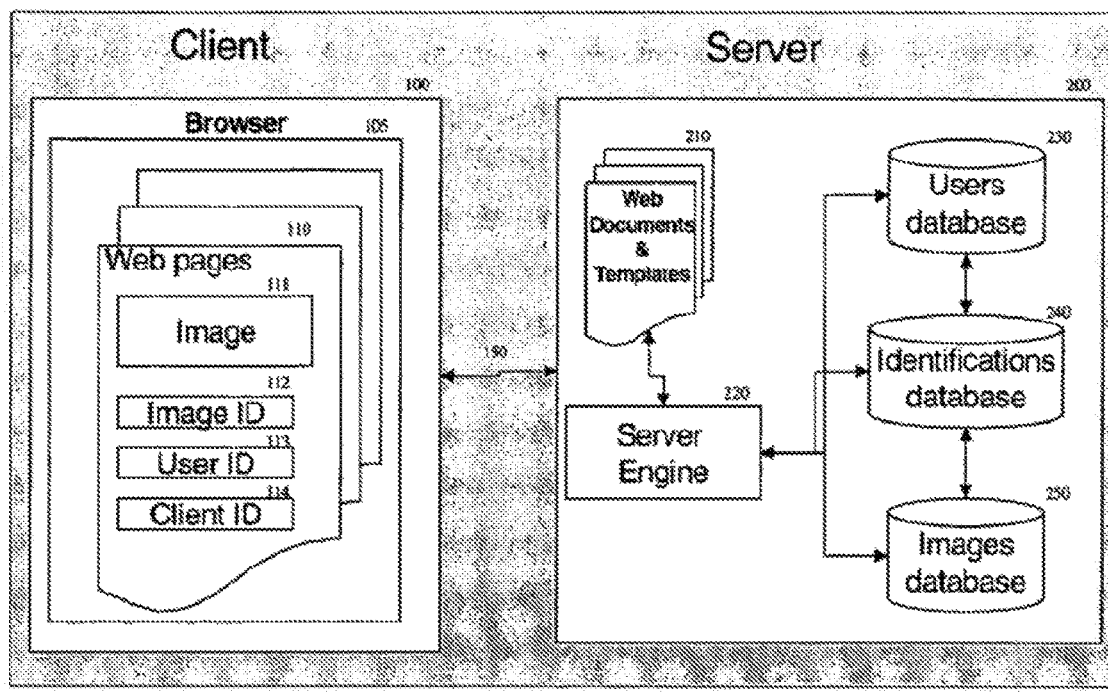
FIG. 1 is a schematic diagram of computer and communications equipment that may be used to implement an embodiment of the present invention.

Embodiments of the invention can be implemented in hardware, software, firmware, or a combination thereof. In one or more embodiments, however, the invention is implemented with one or more computer programs that operate one or more pieces of computer equipment broadly referred to by the numeral 101 in FIG. 1. Such computer equipment 101 typically includes a server computer 200 (also referred to as a host computer) and any number of user computers 100 (e.g., client computers) that may access the host computer 200 via a communications network 150. The computer programs and equipment illustrated and described herein are merely examples of programs and equipment that may be used to implement an embodiment of the invention and may be replaced with other software and computer equipment without departing from the scope of the invention. For example, any computational device configured to display image data may be configured to implement one or more aspects of the invention.

Host computer 200 may be any computing device such as a network computer running Windows 2000, Novel Netware, Unix, or any other network operating system. The host computer 200 may be connected to a firewall computer at the boundaries of network 150 to prevent tampering with information stored on or accessible by the host computer 200 and to another computing device that may operated by an administrator of the host computer 200. If the invention is implemented with the Internet, the host computer 200 may include conventional web hosting operating software, an Internet connection such as a modem, DSL converter or ISDN converter, and be assigned an IP address and corresponding domain name so that the website hosted thereon can be accessed via the communications network 150.

Client computer(s) 100 may be used by anyone wishing to upload and/or view photographs via host computer 200. The client computers 100 may be any device or group of devices that permits access to host computer 200 via communications network 150, including, but not limited to, personal or laptop computers such as those manufactured and sold by Dell™, Compaq™, Gateway™, or any other computer manufacturer, handheld personal assistants such as those operating with Palm's PalmOS™ operating software or those operating with Microsoft's PocketPC™ operating software, mobile phones, or even Internet appliances that are specifically designed for accessing the Internet such as WebTV™. Each client computer 100 may also include or can access a conventional Internet connection such as a modem, Digital Subscriber Line (DSL) converter, or Integrated Service Digital Network (ISDN) converter and a web browser that permits it to access and view data over the Internet.

The communications network 150 may be the Internet but can also be any other communications network such as a local area network, a wide area network, a wireless network, an intranet or a virtual private network. Hereinafter, the term Internet or communication network refers to any type of interconnection fabric that provides computers coupled to the network with a mechanism for transmitting and/or receiving data.

The computer program or programs embodying one or more aspects of the invention are stored in or on computer-readable medium residing on or accessible by host computer 200 and provide a mechanism for instructing host computer 200 to operate the invention as described herein. The computer programs typically comprise ordered listings of executable instructions for implementing logical functions in host computer 200 and user computers 100 coupled with host computer 200. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. Examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

In an embodiment of the invention, host computer 200 comprises server engine 220 which is programmed to operate or host a website and serve as a repository for images and identification information for objects within the images as described in more detail below. The images may be photographs, graphics, artwork, or any other digital image that contains or depicts one or more objects. The objects within the images may include people, animals, plants, buildings, places, or anything else shown in images. In one embodiment of the invention, the images and objects are referred to (but not limited to) as photographs and people, respectively. The reader should note that the term object as used herein includes any identifiable entity within the image data.

Server engine 220 can access web page templates 210, databases 230, 240, and 250, and internal or external memory. Web page templates 210 can be any technology used to transcribe data from a data source into a web page or otherwise provide "dynamic" or customized documents, including but not limited to, Active Server Pages, Java Server Pages, Cold Fusion, PHP, CGI scripts, or even client-side scripts. Server engine 220 receives information and requests from user computer(s) 100 via communications network 150, processes web page templates 210 by transcribing data from data sources, including databases 230, 240, and 250, into templates 210, and sends the resulting web page or document to requesting client computer 100 as described in more detail below.

Figure 2:
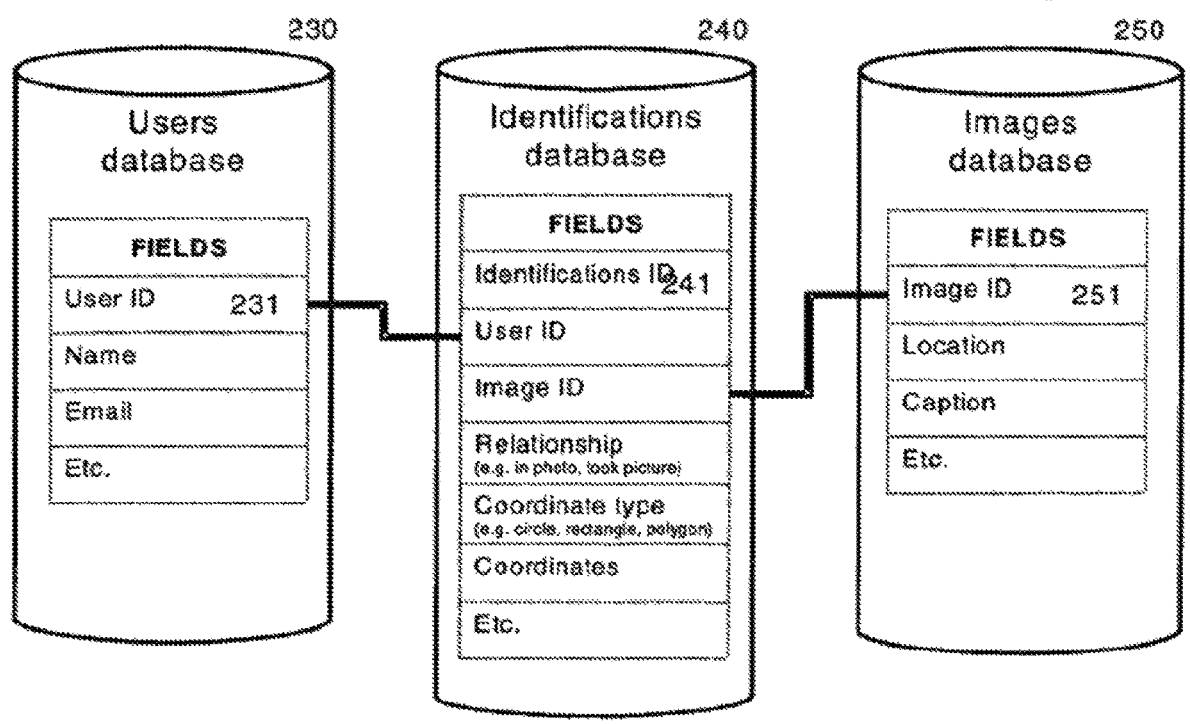
FIG. 2 is a schematic diagram of databases that may be used to implement certain aspects of the invention.

In order to implement the invention host system 200 will access a server system or database system configured to support the functionality described. Referring back to FIG. 2, one or more databases could be utilized to store the data utilized by the system. For instance, the system may utilize a users database 230, Identifications database 240, and Images database 250 as depicted in FIG. 2.

Users database 230 receives, stores, and provides information about people or any other objects identified within photos, including various people who access host computer 200. Users database 230 can be populated to include, for each user or client system, a user identifier that is unique to that user or client system, and other information such as the user's name, e-mail address, home page address, and/or a list of contacts. The list of contacts is not necessary and may be stored in a separate database.

Images database 250 receives and stores information about photos (e.g., image data) uploaded or otherwise made accessible to the network by users. Images database 250 can be populated as described below to include, for each photo, a photo identifier that is unique to that photo, and the location of the image file on the network. The Images database 250 may include descriptive information about the photo such as a caption or the date the photo was taken. While it is preferred to have photos uploaded to and stored on the host computer 200, it is possible to have the photos stored elsewhere, being still accessible to users on the network, such as another website or a personal computer connected to the network. In an embodiment of the invention, both of these processes will be referred to hereinafter as uploading. It is also possible to store the images directly into the database itself as binary objects, rather than simply storing information about the location of the image elsewhere on the network.

Identifications database 240 may receive, store, and provide information about relationships between users and photos. Accordingly, in one embodiment of the invention Identifications database 240 links information in Users database 230 with information in Images database 250. Identifications database 240 may be populated as described below to contain fields specifying what kind of relationship exists between a photo and a user (e.g. the user is in the photo, the user took the photo, the photo has been shared with the user, etc.). In one embodiment of the invention, Identifications database 240 also can store information about the location within a photo, or the "coordinates", that a user or other person appears.

For example, a user, John Doe, may access and sign-up with host computer 200 and be assigned a user I.D. of "007" in the Users database. The Users database 230 could then be populated to include the following record:

| User I.D. | Name | Email | Contacts |
| --- | --- | --- | --- |
| 007 | John Doe | jdoe@doe.com | John, Jane, Lisa |

The user, John Doe, may then upload a photo, "my_image.jpg", which may be assigned an image I.D. of "ABCD" in Images database 250. Images database 250 could then be populated to include the following record:

| Image I.D. | Location | Caption | Uploaded by |
| --- | --- | --- | --- |
| ABCD | C:\dir\my_image.jpg | John and Jane at the beach | 007 |

To identify the user, John Doe, with this image, my_image.jpg, host computer 200 inserts into Identifications database 240 a record with John Doe's User I.D. (i.e. "007") in the User I.D. field and my_image.jpg's Image I.D. (i.e. "ABCD") in the Image I.D. field. This creates a relationship between this user and this image. Assume now it is desired to identify John Doe as appearing in a certain area within the image. In HTML, image coordinates are used to define an area within an image. By storing the image coordinates in this record, we can define specifically where within my_image.jpg that John Doe appears. Assuming John Doe appears in the circular area bound by the coordinates 50,50,25 (x-axis location, y-axis location, radius of circle), the Identifications database 240 entry would appear as follows:

| User I.D. | Image I.D. | Shared by | Coordinates |
| --- | --- | --- | --- |
| 007 | ABCD | 007 | 50, 50, 25 |

Similarly, another user, Jane Doe, who also appears in the photo uploaded by John Doe, can be identified in my_image.jpg by inserting an additional entry into the Identifications database 240. The database entries could now be the following.

| User database | | | |
| --- | --- | --- | --- |
| User I.D. | Name | Email | Contacts |
| 007 | John Doe | jdoe@doe.com | John, Jane, Lisa |
| 008 | Jane Doe | janedoe@doe.com | Jane, John, Fuzzie |

| Images database | | | |
| --- | --- | --- | --- |
| Image I.D. | Location | Caption | Uploaded by |
| ABCD | C:\dir\my_image.jpg | John and Jane at the beach | 007 |

| Identifications database | | | |
| --- | --- | --- | --- |
| User I.D. | Image I.D. | Shared by | Coordinates |
| 007 | ABCD | 007 | 50, 50, 25 |
| 008 | ABCD | 007 | 25, 75, 10 |

As a result, two users have been identified within the image, my_image.jpg, each defined by a record in the Identifications database 240.

The host computer 200 may access information in the Identifications database to find all the people identified in a given photo or to find all the photos a given person has been identified in.

When the host computer 200 wishes to find all the people identified in a specific image, it will look for all records in the Identifications database 240 where the Image I.D. equals a supplied I.D. (e.g. "ABCD"). In this example, it will look for all occurrences of "ABCD" in the Image I.D. field of the Identifications database. This will result in finding two records. The first record in the Identifications database 240 identifies user 007 (John Doe) as being in the photo and the second record identifies users 008 (Jane Doe) as being in the photo. In this case, since image coordinate information has also been supplied, we can further specify precisely where in the photo each user appears: John Doe appears in the circular area defined by the coordinates 50,50,25 and Jane Doe appears in the circular area defined by the coordinates 25,75,10.

When the host computer wishes to find all the photos that a specific user appears in, it will search for all records in the Identifications database 240 where the user's I.D. equals a supplied I.D. (e.g. "007"). For example, if attempting find all photos that John Doe appears in, the host computer 200 will search for all records in the Identifications database 240 where the Users I.D. equals "007". In this example, the host computer will only find one image: my_image.jpg, with an Image I.D. of "ABDC".

Operation

In an embodiment of the invention, prior to storing information about the existence of a person within an image, information about the person is present in the Users database and the information about the corresponding image is present in the Images database.

The Users database may be populated when a user operating one of the user computers 100, contacts the host computer 200, and supplies certain information such as a name, e-mail address, and/or other naming information. The host computer 200 then assigns each user a unique user identification number and stores the other information entered by the user along with the User I.D. number in the Users database 230. Users may request to enter a number of other persons as contacts or be prompted if they would like to add specific users as contacts, for example when viewing another person's album. The contacts may include, for example, friends and family members who regularly appear in photographs taken by the user and/or persons who may wish to receive or view photographs taken by the user. The use of contacts, while not necessary, enables the system to filter the number of records in the users database and provide only the most relevant people to the user when identifying people or searching for photos.

The Images database 250 is populated when users upload photographs to the host computer 200. Each photograph that is uploaded is assigned a unique image I.D. The location of the photograph on the network is also stored in the Images database 250.

Figure 3:
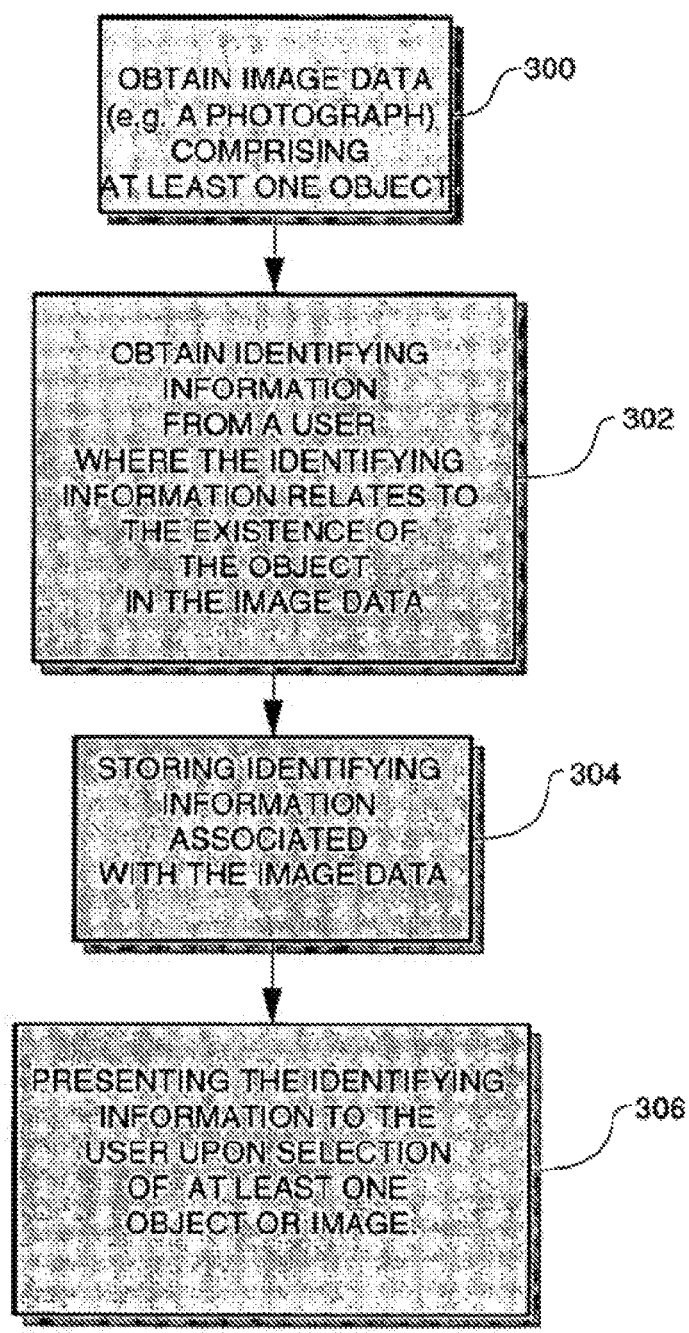
FIG. 3 is a flow chart illustrating a high-level overview of the steps of an embodiment of the invention.

At a high-level, embodiments of the invention are configured to perform the steps set forth in FIG. 3. Users of the system can supply and/or receive information about the existence of objects within images. The process initiates by obtaining image data comprising one or more objects (see e.g., step 300). For instance, a user may provide a system embodying the invention a digital photo of a group of friends and family members. At step 302, the system obtains identifying information from the user where the identifying information relates to the existence of at least one object in the image (e.g., digital photo). For example, when viewing an image, a user may select the name of a person from a list to identify this person as existing in the image. The process for obtaining identifying information is shown in further detail in FIG. 6 and described in further detail below. The identifying information may be stored in the databases (e.g., step 304) illustrated in FIG. 2. The identifying information is displayed to a user (e.g. step 306). The identifying information may be displayed in several different ways. For example, the system may provide an output displaying an image and listing the names of all objects identified therein. In another example, the system may provide a listing of all images a specific person is identified in. Further descriptions of the various ways to display identifying information are described below in FIGS. 7, 8, 9, and 10.

Obtaining Identifying Information

In one embodiment of the invention, "identifying pages" are web pages that permit users to identify people or other objects within photos that have been uploaded or otherwise made accessible to host computer 200. Thus an identifying page is utilized in accordance with one embodiment of the invention to obtain identifying information. Host computer 200 generates an identifying page and sends it to a user upon request.

Figure 4:
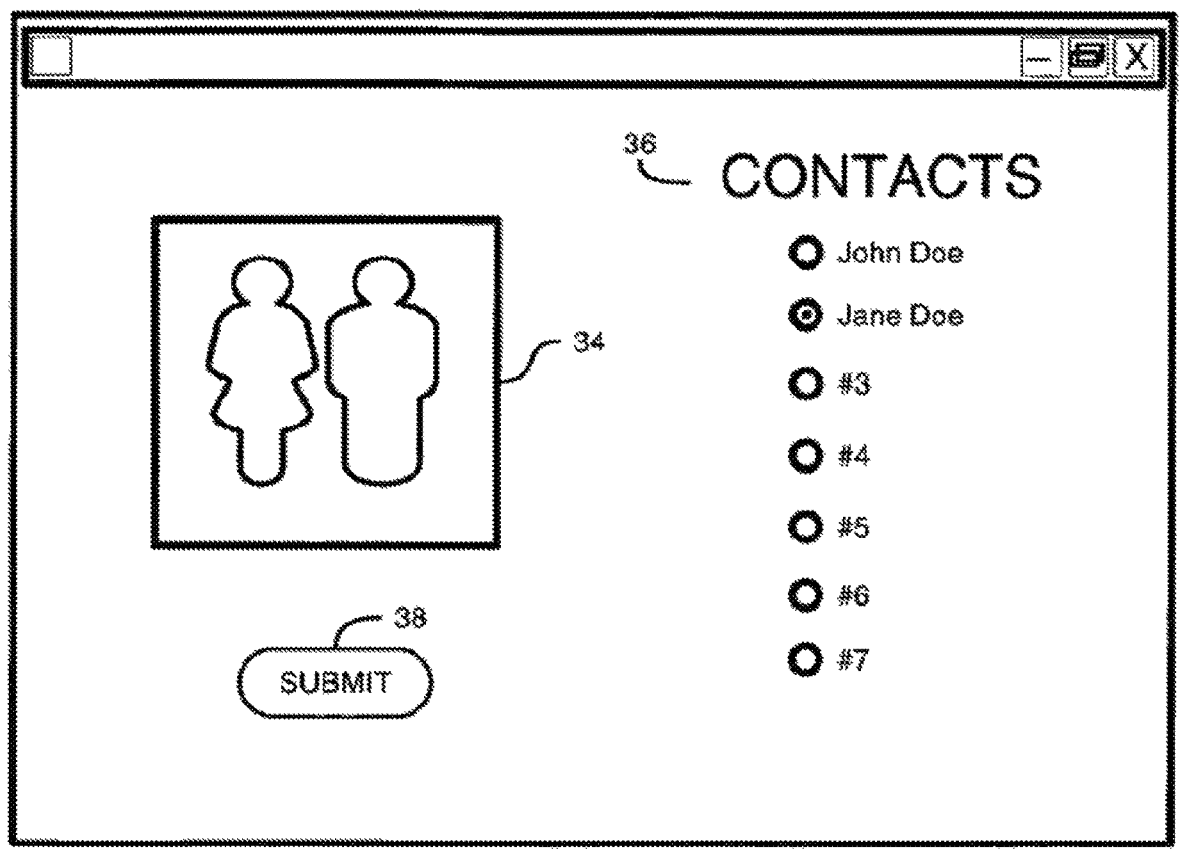
FIG. 4 is a schematic diagram of an identifying page that may be used when identifying objects within an image in accordance with an embodiment of the invention.

FIG. 4 illustrates a sample identifying page in accordance with an embodiment of the invention. The identifying page includes a photo 34 requested by the user, a list of contacts 36 associated with the user, and a "Submit" button or link 38. These elements are typically contained within an HTML form embedded within the page. The image may be associated with either a server-side image map or an image type of input element, both of which enable the location of a user's click on the image to be detected and sent back to the host computer 200. The list of contacts 36 can be transcribed into the identifying page as HTML elements that enable the user to select one or more contacts from the list 36. Several HTML elements exist that provide this functionality including check boxes, radio buttons, and select/list input objects. The name of each contact is displayed as illustrated; however, information corresponding to each contact, such as the contact's User I.D., is embedded into the HTML element but not displayed. The form may also store the Image I.D., but the Image I.D. need not be displayed. An HTML form can utilize a "Hidden" input element for this function. Embedding this information enables the user's browser to send both the selected contact's Users I.D. (i.e. the person being identified) and the Image I.D. back to the server for insertion into the identifications database. Non-HTML media may also be used for this function Macromedia Flash and Shockwave Players, Java applets and/or ActiveX controls.

Generating an Identifying Pages

Figure 5:
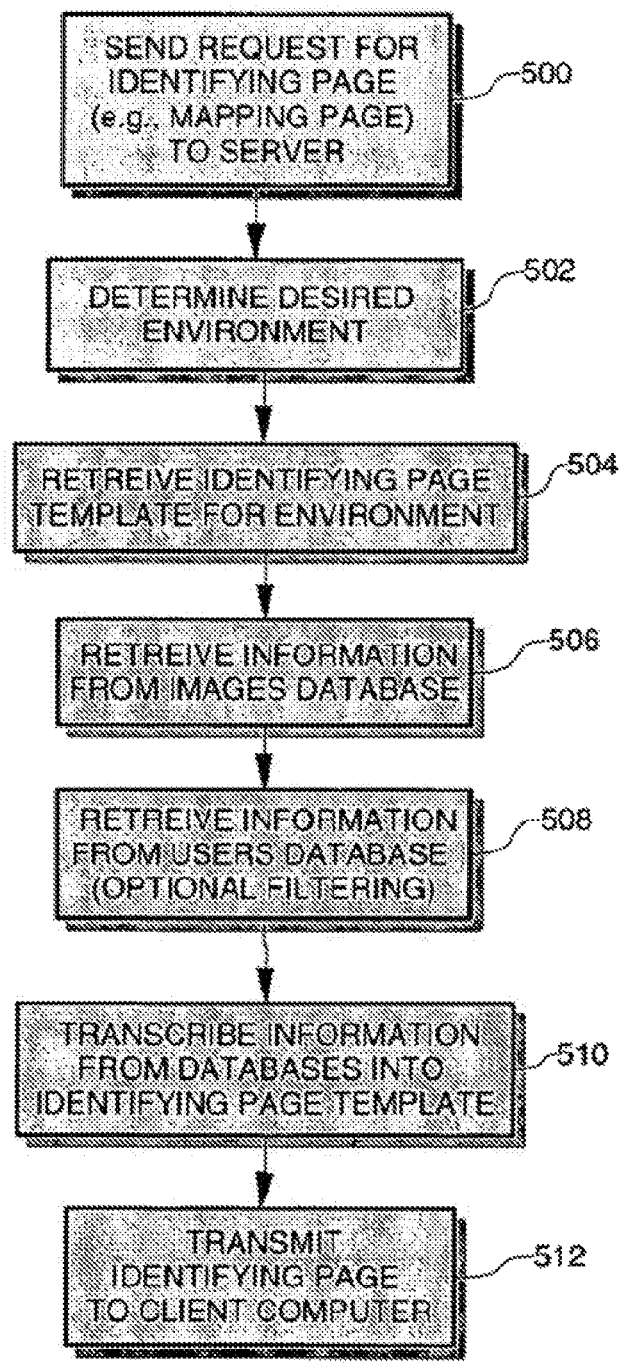
FIG. 5 further describes the general details relating to the process for requesting, generating, and transmitting an identifying page to the requestor (e.g., the client computer).

FIG. 5 further describes the general details relating to the process for requesting, generating, and transmitting an identifying page to the requestor (e.g., the client computer). An identifying page is typically encountered, for example, when a user accesses host computer 200 to view photos and request to identify people within the photos (see e.g., step 500). The host computer 200 may display photos in an album alongside an "identify people" button or link that may be selected to request an identifying page. Embedded in the button or link is a request for an identifying page, the image I.D. for the photo, as well as the user I.D. for the person requesting the page. If a user selects the button or link, host computer 200 performs a set of steps in order to prepare the identifying page for the requesting computer (see e.g., step 502-510). In accordance with one embodiment of the invention, host computer 200 responds to the request by determining a desired output environment (see e.g., step 502) such as utilizing HTML, Macromedia's Flash player, or other display environments. The desired display environment is determined in accordance with one embodiment of the invention based on compatibility with the client. The identifying page template may be adjusted at step 504 to conform to the appropriate display environment. For example, in one embodiment of the invention, the document template may be targeted at a handheld device such as a PDA. The invention flexibly adjusts the display environment for the intended environment. In other instances, the display environment may be a client computer configured to display web pages or some other type of document output having embedded images. Once the appropriate identifying page template is obtained (e.g., by accessing templates 210), the system retrieves the information utilized to populate the identifying page template (e.g., at steps 506 and 508). For example, the system may search Images database 250 for the appropriate image corresponding to the Image I.D. Host computer 200 may accesses Users database 230 to retrieve a list of objects to identify in the image. Then system may optionally filter this list providing only the most relevant objects to select from (e.g. only providing a list of contacts). Host computer 200 then transcribes or otherwise provides the retrieved information into the identifying page template and sends the completed identifying page to the user at the client computer who requested the page (see e.g., step 512).

Below is sample code from one embodiment of an identifying page:

```
<html>
    <form action="identify.asp">
    choose person to identify
    <select name="Users_ID">
        <option value="007">John Doe</option>
        <option value="008">Jane Doe</option>
        <option value="009">Justin Doe</option>
    </select>
    choose radius size
    <select name="radius">
        <option value="50">small</option>
        <option value="100">medium</option>
        <option value="200">large</option>
    </select>
    <input type="hidden" name="Files_ID" value="ABCD">
    <input type="image" src="my_image.jpg">
    </form>
</html>
```

In this example, host computer 200 transcribes information from the users database into a HTML Select element. The host computer transcribes each User I.D. into the value property, and each users' name as labels, enabling the page to send the selected User I.D. back to the host computer. Host computer 20 also transcribes information from the Images database to the template. The image I.D. is transcribed to the value property of an HTML hidden element and the image name is transcribed to the source property (i.e. "src") of an HTML Image Input element.

The sample code is an example of a way to create an identifying page, but the invention also contemplates the use of other coding techniques for generating identifying pages.
Using Identifying Pages Once the identifying page is sent to a user computer 100 by the host computer 200, the user may view the page with a browser and then identify people within the photo 34 displayed on the page. The process for obtaining identifying information is described in further detail in the description relating to FIG. 6.

In one embodiment, the user may simply select or click on the names of all people in the contact list 36 that are in the displayed photograph 34. In another embodiment, the user may be asked to select one contact and to identify the area within the photograph that the contact appears, for example, by clicking on the person's face. The identifying page may include elements that have the capability of sending back to the host computer 200 the location, or coordinates, within the photo 34 that have been clicked. Two elements in HTML that provide this functionality are server-side image maps and the image type of input element (e.g. HTML tag <input type="image" src= . . . >). The invention also contemplates the use of other methods for obtaining coordinate information. The number of clicks required to capture the coordinates of a person's location is a tradeoff between ease of use and accuracy. A single click is sufficient to capture coordinate information if assumptions are made about the size of the area surrounding the point of click (i.e. the radius). Two clicks can be used to define either a circular area (one click to identify the center point and another click to measure the radius) or a rectangle (one click at each of two opposite corners). Three or more clicks can be used to define a polygonal area (one click for each corner). The computer programs configured in accordance with an embodiment of invention utilizes two clicks, one sets the center point of a circle and a second to determine the radius.

Such functionality can also be accomplished through non-HTML media, including Macromedia's Flash Player. For example, in the Flash player, a movie clip can be generated for the purpose of highlighting and identifying a particular person. Through the use of the Flash player's client scripting language, ActionScript, variables can be set based on the location of this "highlighter" clip over an embedded image. Properties such as the clip's x, y, height, width, xscale and/or yscale properties provide this information. The Flash player can send this information back to the server using commands such as ActionScript's getURL, loadVariables, and loadMovie commands allowing the server to insert this information into the database. Such an environment would provide the same functionality as its HTML counterpart.

When the user has completed identifying people in the photo 34 and, if desired, their coordinates, the browser on the user computer 100 sends the user identifier, the image identifier, and any coordinates, all of which are embedded in the form, back to the host computer 200. This can be done automatically after the user clicks a certain number of times or manually after the user clicks the Submit button 38. The host computer 200 receives the information transmitted by the user computer 100 and inserts a record into the Identifications database 240 containing the user identifier, the image identifier, and any coordinates as described above.

The host computer 200 may also automatically share a photo with all persons who were identified therein. E-mailing the photo to the identified persons or adding the photo to the identified persons' photo albums may accomplish such sharing.

Figure 6:
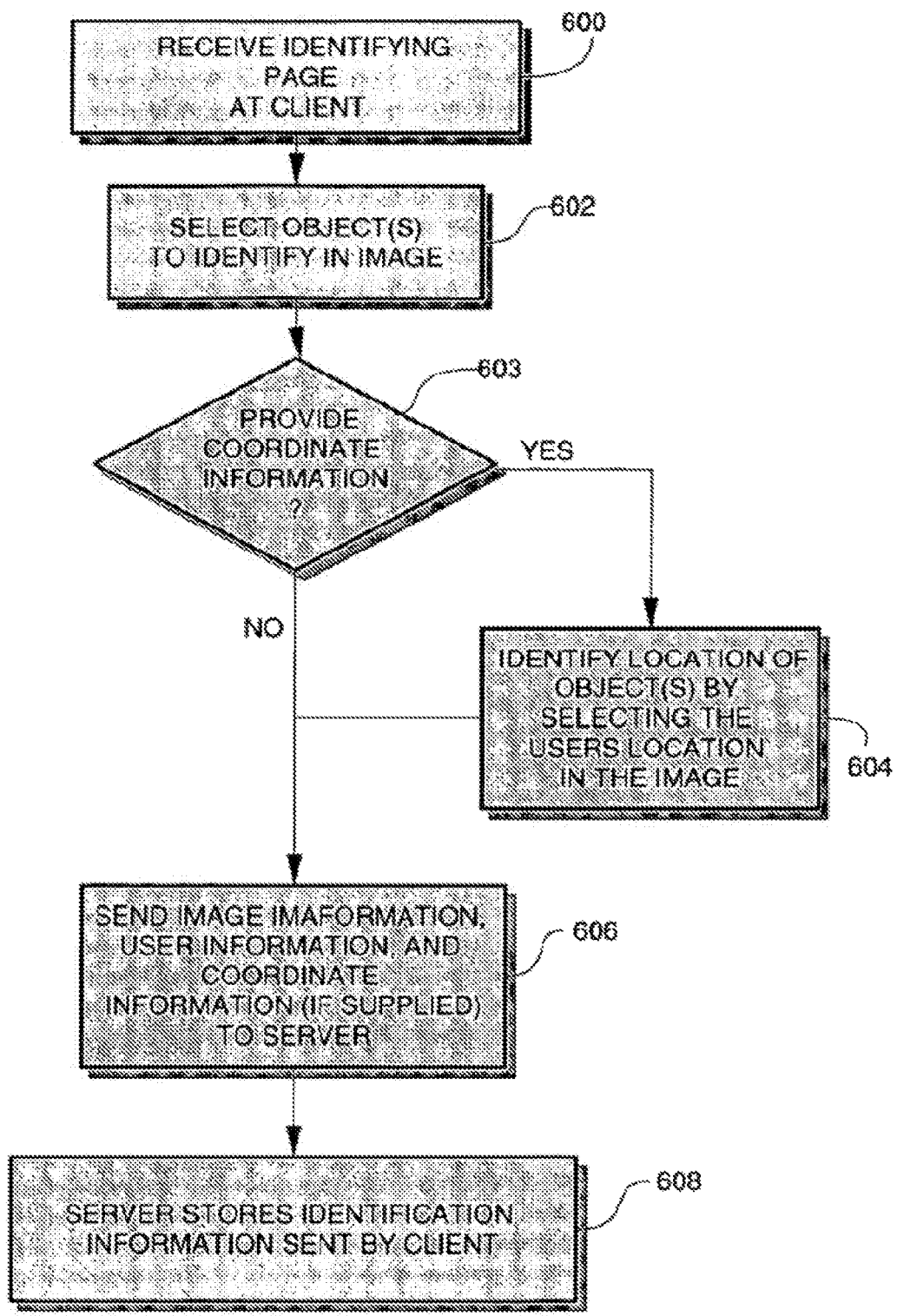
FIG. 6 is a flow diagram illustrating a general overview of the process for using the identifying page to obtain identifying information (e.g., information associated with object(s) in an image) from the user.

FIG. 6 is a flow diagram illustrating a general overview of the process for using the identifying page to obtain identifying information (e.g., information associated with object(s) in an image) from the user. Upon receipt of the identifying page (see e.g., step 600) client computer 100 displays the page to the user. The identifying page contains the image data to be defined and provides the user with a mechanism for associating information about an object (e.g., identifying information) with an object in the image. The user can use the identifying page to select one or more objects (e.g., people) to identify in the image that was provided (see e.g., step 602). In one embodiment of the invention, the user can further provide coordinate information (see e.g., step 603) about an object by selecting the objects location in the image (see e.g., step 604). At step 606 identifying information (e.g., image ID, user ID, and any coordinates) is supplied to the server for processing. At step 608 the server stores the identifying information by associating that information with a particular image or set of images. For instance, once the appropriate information (e.g., the identifying information) is collected the system forwards the data to a server system for storage. For instance, the client system may transmit an image ID, User ID, and coordinate information (if supplied) to the server system for processing (see e.g. at step 606). The server initiates storage by generating a record containing the defined identifying information. For instance, in one embodiment of the invention the server inserts into the identifications database a record containing the transmitted information (see e.g., at step 608). However, the invention also contemplates the use of other databases and or data storing methodologies to retain data about the objects within an image. The data can be stored in any way that retains it for later retrieval.

The system may also be designed to collect additional types of identifying information from the user or from some other source about the image and/or the object in the image. In each instance, the user will typically be the one that initially identifies the objects within the image. However, once an object has been identified as described above, the invention also contemplates the use of other mechanism to further extend object definition. For instance, artificial intelligence algorithms (e.g., image recognition system) may be applied against images and utilized to further define characteristics of images, obtain identifying information, and/or search a database for other possible matches to a named object.

Display Identifying Information

Once identifying information has been received and stored at host computer 200, the system can display information about objects identified within images (identifying information). As described above, identifying information can be displayed in several ways. For example, while viewing an individual image, a list of all objects in the image can be provided or naming information can be displayed when a user points a cursor at an object in the image. Another example of displaying identifying information is to display a list of all images an objects has been identified in. Both of these examples are further described below.

Displaying Objects Identified within an Image

Once host computer 200 has at least partially populated Identifications database 240, as described above, it can create a display page that allows users to view a photo and determine the objects that have been identified in the photo. In an embodiment of the invention, any user or other person that accesses host computer 200 may request a display page containing a particular photo (see e.g., FIG. 8, step 800). For example, a user may access host computer 200 to view photos. Host computer 200 may provide a list of links to photos, each link having an image identifier and a request for a display page embedded therein. Such a link may be in the form of a smaller version of the photo, commonly referred to as a "thumbnail." When a user clicks on the link, the image identifier and display page request are sent to host computer 200. Upon receiving the request, host computer 200 analyzes the image identifier in the embedded link, retrieves a display page template from templates 210. In accordance with one embodiment of the invention, host computer 200 may determine a desired display environment for the client (see e.g., step 802) and retrieve a display page template for that display environment (see e.g., step 804). Information used to populate the display page template is then obtained. For example, the system may retrieve an image's location from Images database 250, and retrieves the information about who has been identified within this image from Identifications database 240. Host computer 200 may then transcribe the image location information and the identification information for those individuals who have been identified in this image into the display page (see e.g., step 807). If coordinate information is present and it is desired to display coordinate information the system can further transcribe that the coordinate information into the display page templates (see e.g., step 808 and 810). Host computer 200 then sends the completed display page to the user who requested it (see e.g., step 814).

Figure 7:
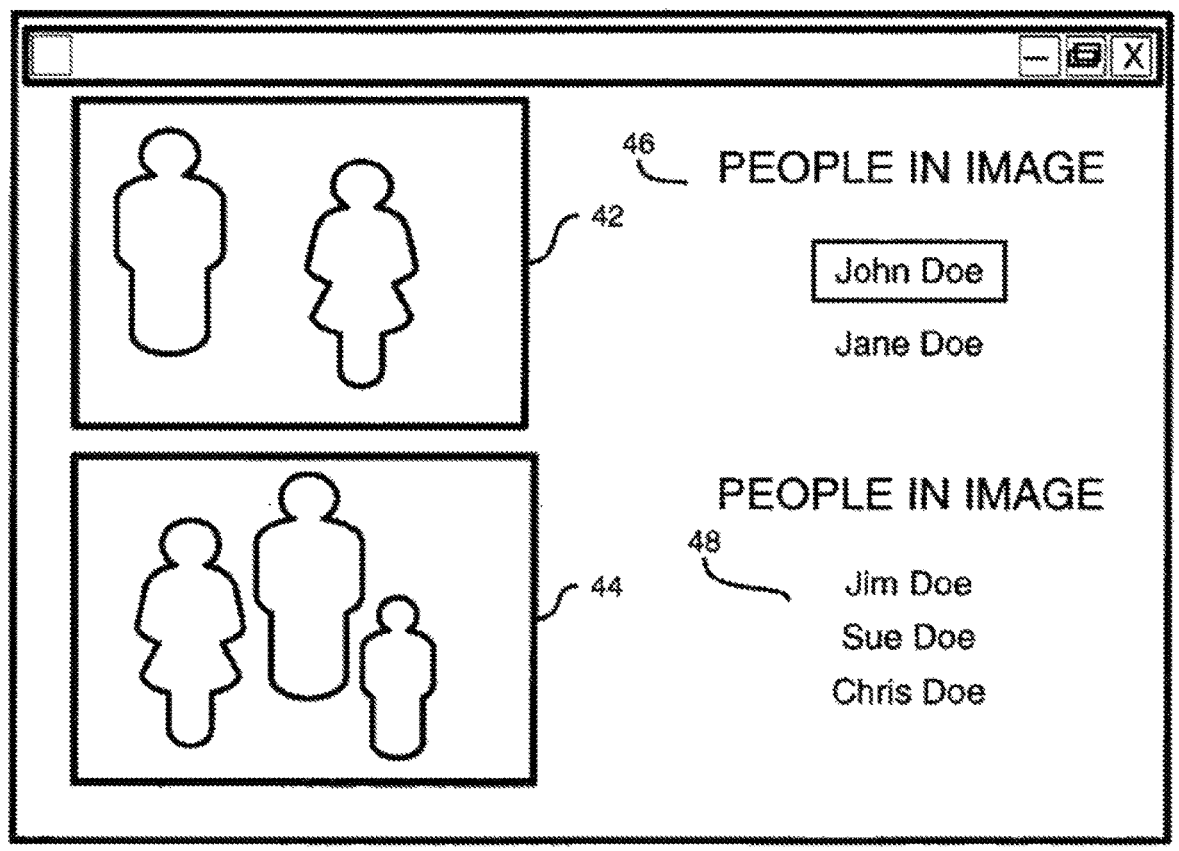
FIG. 7 is a schematic diagram of a display page that may be used to display images and information about objects that have been identified within the image in accordance with an embodiment of the invention.
Figure 8:
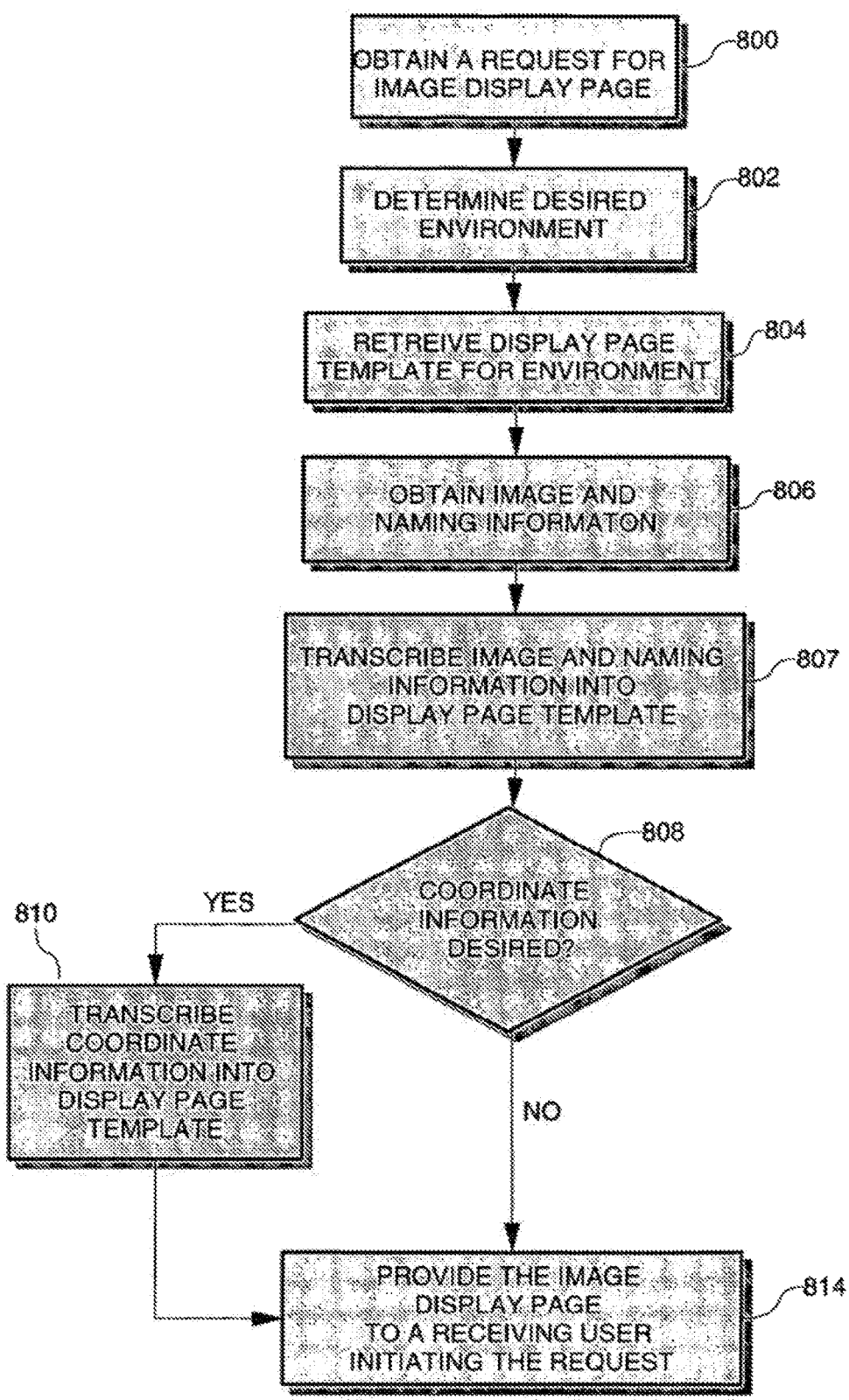
FIG. 8 is a flow chart illustrating a high-level view of the process for providing display page to a requesting user in accordance with an embodiment of the invention.

FIG. 7 illustrates a sample display page in accordance with an embodiment of the invention. The display page includes one or more requested images 42, 44, and for each image, a list of identification information for all persons displayed within the image. The identification information may also be embedded in the display page and only displayed when certain actions are taken by a user. In one example, the person's name may be displayed as a user points a computer-generated cursor at a person within the photo. In another example, a circle may be drawn around a person's location in a photo when a user click on the person's name. The display page may also allow a user to gain more information about the person in the photo. For example, a user may click on an identified person within the image to send a request to the host computer 200 for another page, such as a contact information page or search results for other photos of this person.

Below is sample code for a display page used in one embodiment of an HTML display page.

```
<html>
    <img src="my_image.jpg" usemap="#My_Map" >
        <map name="My_Map">
        <area shape="rect" coords="16,126,246,422"
        href="user.asp?user_id=007"
onMouseOver="alert('John Doe');">
        <area shape="circle" coords="368,343,90"
href="user.asp?user_id=008"onMouseOver="alert('Jane Doe');">
        <area shape="poly"
        coords="625,301,549,123,377,162,446,292,491,423"
href="user.asp?user_id=009" onMouseOver="alert('Justin Doe');">
        </map>
</html>
```

In this example, information about the image file, my_image.jpg, is retrieved from the Images database 250 and transcribed to the source property of the image tag (<img src=" ">). The "usemap" property of the image object tells the browser to create link areas bound by the coordinate property in each area tag of the map named "My_map". Each area is related to a record in the Identifications database 240. Each area of the image map has a shape property, a coordinates property (which defines the area), and a link property. Each set of coordinates is transcribed from the Identifications database 240 and defines an area on the image where the corresponding user appears. A link may be used as part of the image map. In this example, each area is linked to a hypothetical user homepage template named "user.asp". The server appends this link by transcribing each User I.D. to the hyperlink. When a client clicks on an area, the link information is sent to the server engine 220. The server engine 220 is able to access the Users database 230 using the User I.D. appended to the hyperlink. The server 220 can then generate from the "user.asp" template, a homepage with the user information obtained from the database. In this embodiment, the display page also utilizes client side scripting to display identification information when the user points at identified person in the image. Utilizing the "onMouseOver" event handler, this display page calls a javascript alert method, which instructs the browser to "pop up" a message to user. In this example, the host computer 200 transcribes each user's name into the alert method. As a result, whenever the user points to an identified person in the image, the browser will "pop up" a message box displaying the user's name. The reader should note, however, that the sample code for generating a display page is not intended to limit the scope of the invention. The invention may utilize any software coding mechanism for implementing the functionality described herein.

Figure 9:
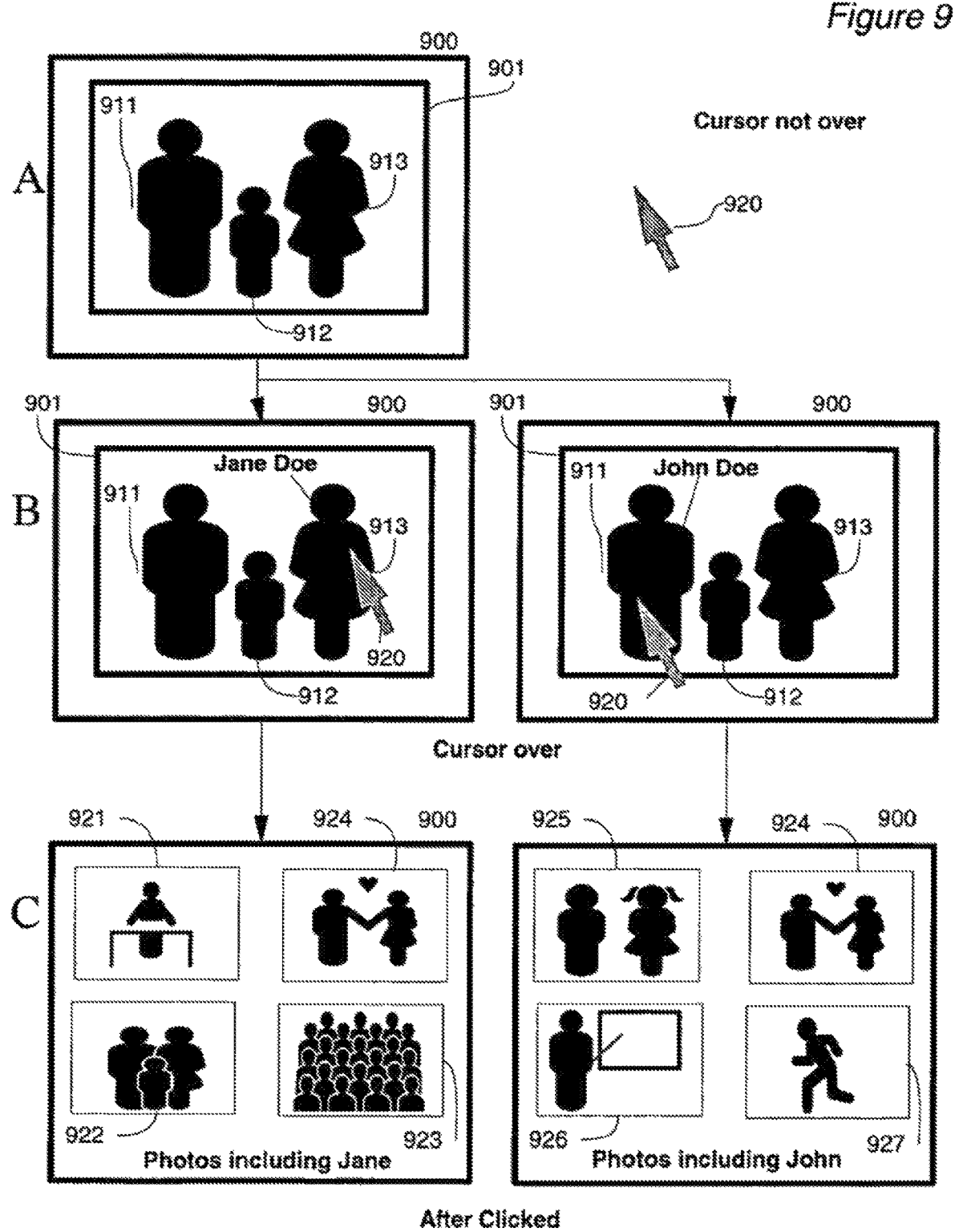
FIG. 9 illustrates various ways to display identification information, including the various states a user interface configured to operate in accordance with an embodiment of the invention may have.

FIG. 9 illustrates various ways to display identification information. Blocks A & B illustrate an interface that displays who has been identified in an image as a user interacts with a page displaying an image. In Block C, identification information is displayed by showing a list of images that certain users have been identified in. The process to derive this list of images is further described in FIG. 10.

In Blocks A & B of FIG. 9 the state (e.g., appearance) of the interface varies depending upon whether cursor 920 is over an object (e.g., at least one of objects 911, 912, and 913) or not over an object. When cursor 920 is not over an object, interface 900 contains a representation of image 901 containing depictions of one or more objects in the image. This interface state is depicted at block A of FIG. 9. In one embodiment of the invention objects are another way of referring to people. The reader should note, however, that the term object should be construed broadly and that the invention can be adapted for use with anything that can be visually depicted within an image.

Block B of FIG. 9 illustrates user interface 900 when cursor 920 is positioned over an object. In one of the examples illustrated cursor 920 is positioned over object 913. Identifying information, such as the name or type of object, is then shown adjacent to object 913 or in an area within image 901. The invention contemplates the display of identifying information anywhere within interface 900 and may utilize textual, graphical, and/or image data to represent identifying information. In one embodiment of the invention, identifying information defines the object that is selected. Some examples of identifying information include an object's name or some other description or image describing or associated with the object.

When cursor 920 is over object 913 identifying information showing that object 913 is representative of a person named "Jane Doe" is displayed within interface 900. Similarly, when cursor 920 is positioned over object 911, identifying information showing that object 911 is representative of a person named "John Doe" is shown. The identifying information for other objects (e.g., object 912) in image 901 can be obtained by moving cursor 920 over the object. When a particular object is selected (e.g., by depressing an input button associated with cursor 920), a search for all images having the identified object may be initiated.

Displaying Photos that an Object is Identified in

In accordance with an embodiment of the invention, the search returns a set of images having the selected object within the image. Block C shows how the interface appears subsequent to performance of the search (e.g., after an object is selected). Images 921-924, for example, contain object 913 (e.g., Jane Doe) and images 924-928 contain object 911. In some instances the search results may have images comprising both objects 913 and 911 (e.g., image 924). Although block C shows a set of images, the search can also return a textual or graphical list of images having the selected object. In this instance a specific image could then be viewed by selecting the image to be viewed from the list.

Figure 10:
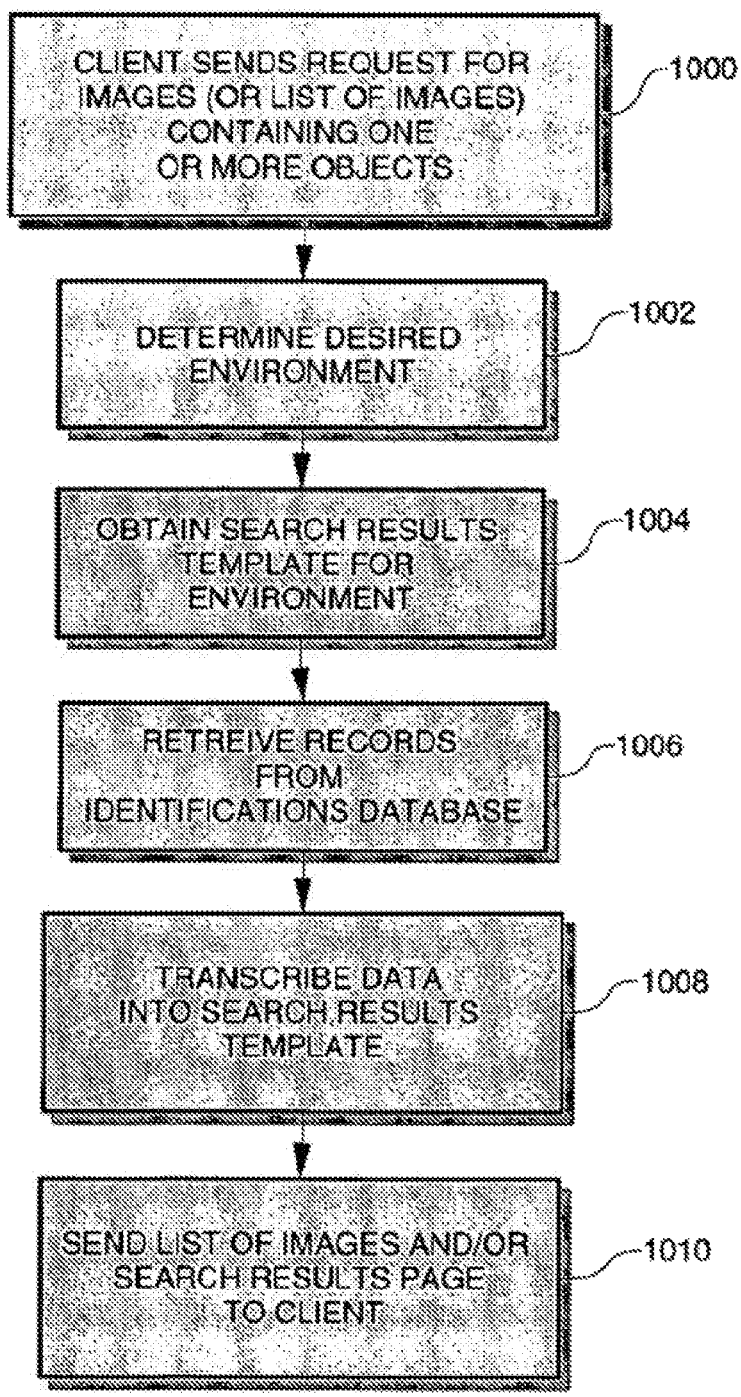
FIG. 10 is a flow chart describing the process for generating a set of search results in response to a request.

FIG. 10 is a flow chart describing the process for generating a set of search results in response to a request. For example, FIG. 10 can describe the process for transitioning between block B and block C of FIG. 9. The client sends a request for images (or a list of images) wherein a specified user, or several users, have been identified. For example a user may select a name (or several names) from a list and request host computer 200 to retrieve additional photos of the selected user(s). In another example (as illustrated in FIG. 9), a users while viewing an image may click on an object in an image to initiate a search for other images having that object. Host computer 200 obtains the request (e.g., at step 1000) and proceeds to prepare a list of images to respond to the request. In accordance with an embodiment of the invention, host computer 200 determines the desired environment (e.g., based on the client), obtains a search results template for that environment, retrieves records from the identifications database, transcribes data into the search results template, and sends a list of images and/or a search results page to the client computer (see e.g., step 1002-1010). When the request is sent, if more than one user is selected, the resulting page may list only images of the selected users together or, alternatively, list any image containing one of the selected users. The list of images, text representative of the images, and/or the images may then be sent to the client system in place of the images as described in the previously set forth examples.

Although the invention has been described with reference to the one or more embodiments illustrated in the attached drawing figures, it is noted that equivalents may be employed and substitutions made herein without departing from the scope of the invention as contemplated in the claims. For example, although an embodiment of the invention identifies persons within photos, it may be used to identify any objects within any images. Furthermore, while HTML is utilized to describe one embodiment, other computer programming languages such as Macromedia's Flash or Shockwave Players, Java applets, ActiveX control, etc. . . . can be utilized to implement the same functionality describe herein. Also, while the identification information described above includes the names of objects, it may instead include other types of descriptive naming information.

Thus, a method and apparatus for obtain information relating to the existence of at least one object in an image has been described. The invention, however, is defined by the claims and the full scope of their equivalents.

What is claimed is:

1. A method implemented on one or more computing devices connected via a communications network, the method comprising:
   by the one or more computing devices, determining a unique user identifier for a first user of the communications network;
   by the one or more computing devices, receiving a naming input initiated by the first user on one of the one or more computing devices, the naming input including descriptive naming information about the first user;
   responsive to receiving the naming input initiated by the first user, storing an association between the unique user identifier of the first user and the descriptive naming information in memory accessible to the one or more computing devices;

storing a unique digital media identifier for an item of digital media accessible to the one or more computing devices in memory accessible to the one or more computing devices;

by the one or more computing devices, receiving an associating input initiated by a second user of the communications network, the associating input initiated on one of the one or more of the computing devices, the second user being different than the first user, the associating input indicating an association of the first user with the item of digital media;

responsive to receiving the associating input initiated by the second user, storing an association between the unique user identifier for the first user and the unique digital media identifier for the item of digital media, the association determined from the associating input initiated by the second user;

transmitting display data for presentation on a graphical user interface on a computing device of a viewing user, the display data indicating the association between the first user and the item of digital media such that a graphical display of the display data in the graphical user interface includes:
  (i) the descriptive naming information included in the naming input initiated by the first user,
  (ii) information determined from the associating input initiated by the second user, and
  (iii) an element configured to provide a prompt to the viewing user to add an association between the first user and the viewing user;

by the one or more computing devices, receiving an input initiated by the viewing user indicating a request to add the association between the first user and the viewing user; and responsive to receiving the input initiated by the viewing user, storing the association between the first user and the viewing user in memory accessible to the one or more computing devices.

2. A method implemented on one or more computing devices connected via a communications network, the method comprising:

by one or more computing devices, storing descriptive naming information about a first user of the communications network in memory accessible to the one or more computing devices, the descriptive naming information determined from a naming input by the first user;

by the one or more computing devices, storing an association between the first user and an item of digital media in memory accessible to the one more computing devices, the association determined from an associating input by a second user of the communications network, the second user being different than the first user;

by the one or more computing devices, transmitting display data for presentation in a graphical user interface on a computing device of a viewing user, the display data indicating the association between the first user and the item of digital media such that a graphical display of the display data in the graphical user interface includes:
  (i) descriptive naming information determined from the naming input by the first user,
  (ii) information determined from the associating input by the second user,
  (iii) an element configured to provide a prompt to the viewing user to add an association between the first user and the viewing user;

by the one or more computing devices, receiving an input initiated by the viewing user indicating a request to add the association between the first user and the viewing user; and responsive to receiving the input initiated by the viewing user, storing the association between the first user and the viewing user in memory accessible to the one or more computing devices.

3. A method implemented on one or more computing devices connected via a communications network, the method comprising:

by one or more computing devices, storing in memory accessible to the one or more computing devices descriptive naming information about a first user of the communications network, the descriptive naming information determined from a naming input received from a computing device of the first user;

by the one or more computing devices, storing in memory accessible to the one or more computing devices information determined from an associating input received from a computing device of a user of the communications network, the associating input indicating an association between the first user and an item of digital media, the associating input received separately from the naming input;

by the one or more computing devices, transmitting display data for presentation in a graphical user interface on a computing device of a viewing user, the display data indicating the association between the first user and the item of digital media such that a graphical display of the display data in the graphical user interface includes:
  i) information determined from the associating input,
  ii) descriptive naming information determined from the naming input, the descriptive naming information in the display data being information other than information received from the associating input, and
  iii) an element configured to provide a prompt to the viewing user to add an association between the first user and the viewing user;

by the one or more computing devices, receiving an input initiated by the viewing user indicating a request to add the association between the first user and the viewing user; and responsive to receiving the input initiated by the viewing user, storing the association between the first user and the viewing user in memory accessible to the one or more computing devices.

4. The method of claim 1, wherein the item of digital media includes image data from a digital image.

5. The method of claim 4, further comprising:

by the one or more computing devices, receiving an image coordinate input initiated by the second user on one of the one or more of the computing devices, the image coordinate input corresponding to a location of the first user within the image data from the digital image; and storing coordinate data corresponding to the location of the first user within the image data from the digital image in memory accessible to the one or more computing devices.

6. The method of claim 1, wherein the descriptive naming information includes a name, email address, screen name, image, or combinations thereof.

7. The method of claim 1, further comprising:

sending, to a device of the viewing user, a graphical interface configured to display a list of users with a stored association with the viewing user, the graphical interface configured to receive an input from the viewing user indicating a selection of the first user;

receiving, from the graphical interface configured to display the list of users with the stored association with the viewing user, an indication of the selection of the first user; and retrieving a list of digital media having an association with the first user.

8. The method of claim 1, further comprising:
sending, to a device of the viewing user, a graphical interface configured to display a list of users with a stored association with the viewing user, the graphical interface configured to receive an input from the viewing user indicating a selection of the first user and a different user;

receiving, from the graphical interface configured to display the list of users with the stored association with the viewing user, an indication of the selection of the first user and the different user; and retrieving a list of digital media having associations with both the first user and the different user.

9. The method of claim 1, further comprising:
sending, to a device of the viewing user a graphical interface configured to display a list of users with a stored association with the viewing user, the graphical interface configured to receive an input from the viewing user indicating a selection of the first user;

receiving, from the graphical interface configured to display the list of users with the stored association with the viewing user, an indication of the selection of the first user;

receiving from the viewing user an input indicating a selection of digital media; and in response to receiving the input indicating the selection of digital media and the indication of the selection of first user, storing an association between the first user and the selection of digital media.

10. The method of claim 9, wherein the selection of digital media comprises image data from a digital image, and the method further comprising:
receiving from the viewing user an input indicating a set of coordinates corresponding to a location of the first user in the image data; and storing coordinate data corresponding to the location of the first user within the image data.

11. The method of claim 1, wherein the element configured to provide a prompt to the viewing user comprises a link to a different graphical user interface, the different graphical user interface including the prompt to the viewing user to add an association between the first user and the viewing user.

12. The method 11, wherein the link to the different graphical user interface comprises a link to a contact information page of the first user.

13. The method of 11, wherein the link to the different graphical user interface comprises a link to a listing of digital media having a stored association with the first user.

14. The method of claim 2, wherein the item of digital media includes image data from a digital image.

15. The method of claim 14, further comprising:
by the one or more computing devices, receiving an image coordinate input initiated by the second user on one of the one or more of the computing devices, the image coordinate input corresponding to a location of the first user within the image data from the digital image; and storing coordinate data corresponding to the location of the first user within the image data from the digital image in memory accessible to the one or more computing devices.

16. The method of claim 2, wherein the descriptive naming information includes a name, email address, screen name, image, or combinations thereof.

17. The method of claim 2, further comprising:
sending, to a device of the viewing user, a graphical interface configured to display a list of users with a stored association with the viewing user, the graphical interface configured to receive an input from the viewing user indicating a selection of the first user;

receiving, from the graphical interface configured to display the list of users with the stored association with the viewing user, an indication of the selection of the first user; and retrieving a list of digital media having an association with the first user.

18. The method of claim 2, further comprising:
sending, to a device of the viewing user, a graphical interface configured to display a list of users with a stored association with the viewing user, the graphical interface configured to receive an input from the viewing user indicating a selection of the first user and a different user;

receiving, from the graphical interface configured to display the list of users with the stored association with the viewing user, an indication of the selection of the first user and the different user; and retrieving a list of digital media having associations with both the first user and the different user.

19. The method of claim 2, further comprising:
sending, to a device of the viewing user a graphical interface configured to display a list of users with a stored association with the viewing user, the graphical interface configured to receive an input from the viewing user indicating a selection of the first user;

receiving, from the graphical interface configured to display the list of users with the stored association with the viewing user, an indication of the selection of the first user;

receiving from the viewing user an input indicating a selection of digital media; and in response to receiving the input indicating the selection of digital media and the indication of the selection of first user, storing an association between the first user and the selection of digital media.

20. The method of claim 19, wherein the selection of digital media comprises image data from a digital image, and the method further comprising:
receiving from the viewing user an input indicating a set of coordinates corresponding to a location of the first user in the image data; and storing coordinate data corresponding to the location of the first user within the image data.

21. The method of claim 2, wherein the element configured to provide a prompt to the viewing user comprises a link to a different graphical user interface, the different graphical user interface including the prompt to the viewing user to add an association between the first user and the viewing user.

22. The method of claim 3, wherein the item of digital media includes image data from a digital image.

23. The method of claim 22, further comprising:
by the one or more computing devices, receiving an image coordinate input initiated by a user on one of the one or more of the computing devices, the image coordinate input corresponding to a location of the first user within the image data from the digital image; and storing coordinate data corresponding to the location of the first user within the image data from the digital image in memory accessible to the one or more computing devices.

24. The method of claim 3, wherein the descriptive naming information includes a name, email address, screen name, image, or combinations thereof.

25. The method of claim 3, further comprising:

sending, to a device of the viewing user, a graphical interface configured to display a list of users with a stored association with the viewing user, the graphical interface configured to receive an input from the viewing user indicating a selection of the first user;

receiving, from the graphical interface configured to display the list of users with the stored association with the viewing user, an indication of the selection of the first user; and retrieving a list of digital media having an association with the first user.

26. The method of claim 3, further comprising sending, to a device of the viewing user, a graphical interface configured to display a list of users with a stored association with the viewing user, the graphical interface configured to receive an input from the viewing user indicating a selection of the first user and a different user;

receiving, from the graphical interface configured to display the list of users with the stored association with the viewing user, an indication of the selection of the first user and the different user; and retrieving a list of digital media having associations with both the first user and the different user.

27. The method of claim 3, further comprising:

sending, to a device of the viewing user, a graphical interface configured to display a list of users with a stored association with the viewing user, the graphical interface configured to receive an input from the viewing user indicating a selection of the first user;

receiving, from the graphical interface configured to display the list of users with the stored association with the viewing user, an indication of the selection of the first user;

receiving from the viewing user an input indicating a selection of digital media; and in response to receiving the input indicating the selection of digital media and the indication of the selection of first user, storing an association between the first user and the selection of digital media.

28. The method of claim 27, wherein the selection of digital media comprises image data from a digital image, and the method further comprising:

receiving from the viewing user an input indicating a set of coordinates corresponding to a location of the first user in the image data; and storing coordinate data corresponding to the location of the first user within the image data.

29. The method of claim 3, wherein the element configured to provide a prompt to the viewing user comprises a link to a different graphical user interface, the different graphical user interface including the prompt to the viewing user to add an association between the first user and the viewing user.

30. A method implemented on one or more computing devices connected via a communications network, the method comprising:

by one or more computing devices, storing in memory accessible to the one or more computing devices descriptive naming information about a first user of the communications network, the descriptive naming information determined from a naming input received from a computing device of the first user;

by the one or more computing devices, storing in memory accessible to the one or more computing devices information determined from an associating input received from a computing device of a user of the communications network, the associating input indicating an association between the first user and an item of digital media, the associating input received separately from the naming input;

by the one or more computing devices, transmitting display data for presentation in a graphical user interface on a computing device of a viewing user, the display data including a representation of the association between the first user and the item of digital media, the representation including:

i) information determined from the associating input, and ii) descriptive naming information determined from the naming input, the descriptive naming information in the display data being information other than information received from the associating input;

by the one or more computing devices, receiving an input initiated by the viewing user indicating a request to add the association between the first user and the viewing user; and responsive to receiving the input initiated by the viewing user, storing the association between the first user and the viewing user in memory accessible to the one or more computing devices.

* * * * *

(12) INTER PARTES REVIEW CERTIFICATE (3671st)
United States Patent
Frigon

(10) Number: US 10,628,480 K1
(45) Certificate Issued: Jul. 31, 2024

(54) LINKING TAGS TO USER PROFILES

(71) Applicant: Mark Frederick Frigon

(72) Inventor: Mark Frederick Frigon

(73) Assignee: ANGEL TECHNOLOGIES, LLC

Trial Number:

IPR2023-00060 filed Oct. 26, 2022

Inter Partes Review Certificate for:

Patent No.: 10,628,480
Issued: Apr. 21, 2020
Appl. No.: 16/537,227
Filed: Aug. 9, 2019

The results of IPR2023-00060 are reflected in this inter partes review certificate under 35 U.S.C. 318(b).

INTER PARTES REVIEW CERTIFICATE
U.S. Patent 10,628,480 K1
Trial No. IPR2023-00060
Certificate Issued Jul. 31, 2024

AS A RESULT OF THE INTER PARTES REVIEW PROCEEDING, IT HAS BEEN DETERMINED THAT:

Claims 1-30 are cancelled.

\* \* \* \* \*